US00RE44783E

(19) United States
(12) Reissued Patent
Scruggs

(10) Patent Number: US RE44,783 E
(45) Date of Reissued Patent: Mar. 4, 2014

(54) FLUSHETTE PARTIAL AND FULL TOILET FLUSH DEVICES

(76) Inventor: Donald E. Scruggs, Chino, CA (US)

(21) Appl. No.: 12/660,678

(22) Filed: Mar. 1, 2010

Related U.S. Patent Documents

Reissue of:
(64) Patent No.: 7,591,027
Issued: Sep. 22, 2009
Appl. No.: 11/879,192
Filed: Jul. 16, 2007

(51) Int. Cl.
*E03D 1/14* (2006.01)

(52) U.S. Cl.
USPC ..... 4/327; 4/415

(58) Field of Classification Search
USPC ..... 4/324–327, 415, 405
See application file for complete search history.

(56) References Cited

U.S. PATENT DOCUMENTS 1,037,679 A 9/1912 Snyder
1,323,703 A 12/1919 Linfoot
1,474,288 A 11/1923 Rath
1,604,428 A 10/1926 Veeder
1,710,827 A 4/1929 Johnson
1,767,043 A * 6/1930 Blaun et al. ..... 4/326
2,182,873 A 12/1939 King
2,320,886 A 6/1943 Quiroz
2,351,672 A 6/1944 Engel
2,389,413 A 11/1945 Carlton
2,760,204 A 8/1956 Joania
2,858,546 A 11/1958 Tekenos et al.
2,940,084 A * 6/1960 Fabbi et al. ..... 4/327
3,064,675 A 11/1962 Johnson et al.
3,113,756 A 12/1963 Griffo
3,320,622 A 5/1967 Wustner
3,487,476 A 1/1970 Stiem et al.
3,605,125 A 9/1971 Gibb et al.
3,628,195 A 12/1971 Skousgaard
3,689,025 A 9/1972 Kiser
3,747,621 A 7/1973 Tine
3,766,571 A * 10/1973 Elder et al. ..... 4/326
3,810,261 A 5/1974 Hollander
3,817,279 A 6/1974 Larson
3,817,489 A 6/1974 Caron et al.
3,820,171 A 6/1974 Larson
3,820,754 A 6/1974 Caron et al.
3,869,733 A * 3/1975 White ..... 4/327
3,879,765 A 4/1975 Moon
3,894,299 A 7/1975 Cleary
3,903,551 A 9/1975 Johnson
3,905,050 A 9/1975 Goza et al.
3,906,554 A * 9/1975 Johnson ..... 4/327
3,988,786 A 11/1976 Lehfeldt
4,003,399 A 1/1977 Fischer
4,014,050 A 3/1977 Goldsworthy
4,034,423 A 7/1977 Milnes
4,042,982 A * 8/1977 Contreras ..... 4/326
4,056,856 A 11/1977 Reid et al.
4,060,857 A 12/1977 Couton
4,077,602 A 3/1978 Klessig
4,088,297 A 5/1978 Doyle et al.
4,115,881 A 9/1978 Stone
4,128,906 A 12/1978 Raz
4,135,263 A 1/1979 Anderson (Continued)

*Primary Examiner* — Gregory Huson
*Assistant Examiner* — Janie Christiansen

(57) ABSTRACT

Toilet flapper valves with multiple volume flush capability which can be quickly and easily installed to replace existing flapper valves in old or new toilets to give such toilets the capability of providing selectable amounts of flushing water.

4 Claims, 7 Drawing Sheets

(56) References Cited

U.S. PATENT DOCUMENTS 4,141,091 A 2/1979 Pulvari
4,141,092 A 2/1979 Jones
4,175,296 A 11/1979 Goldman
4,193,145 A 3/1980 Gross et al.
4,225,987 A 10/1980 Goldman et al.
4,233,698 A 11/1980 Martin
4,304,015 A 12/1981 Hubatka
4,305,163 A 12/1981 Raz
4,357,720 A 11/1982 Stahli
4,406,024 A 9/1983 Chiu et al.
4,411,029 A 10/1983 Huang
4,485,501 A * 12/1984 Kloner ..... 4/324
4,499,615 A 2/1985 Radovsky
4,530,119 A 7/1985 Chiu et al.
4,536,900 A * 8/1985 Hayes ..... 4/324
4,575,880 A 3/1986 Burgess
4,624,018 A 11/1986 Kurtz
4,646,780 A 3/1987 Spooner
4,662,395 A 5/1987 Strangfeld
4,707,868 A 11/1987 Hennessy
4,750,220 A 6/1988 Baumann
4,756,031 A 7/1988 Barrett
4,791,689 A 12/1988 Garcia De Couto
4,817,216 A 4/1989 Auman
4,832,310 A 5/1989 Nestich
4,878,256 A 11/1989 Bagwell
4,937,894 A 7/1990 Hill, Jr. et al.
4,941,215 A 7/1990 Liu
4,945,580 A 8/1990 Schmitt et al.
4,996,726 A 3/1991 Schrock et al.
5,003,643 A 4/1991 Chung
5,005,226 A 4/1991 Basile et al.
5,046,201 A 9/1991 Steinhardt et al.
5,052,060 A 10/1991 Makita
5,070,547 A 12/1991 Comparetti
5,121,510 A * 6/1992 Ricalde Medina ..... 4/326
5,187,818 A 2/1993 Barrett et al.
5,206,960 A 5/1993 Hooshley et al.
5,243,713 A 9/1993 More
5,261,129 A 11/1993 Roy
5,301,373 A 4/1994 Hull et al.
5,309,942 A 5/1994 Oril et al.
5,313,673 A 5/1994 Sandi et al.
5,335,694 A 8/1994 Whiteside
5,341,839 A 8/1994 Kobayashi et al.
5,361,426 A 11/1994 Martin
5,396,665 A 3/1995 Raz et al.
5,400,445 A 3/1995 Hull
5,400,446 A 3/1995 Bloemer
5,427,351 A 6/1995 Korigen
5,431,181 A 7/1995 Saadi
5,435,019 A 7/1995 Badders
5,459,885 A 10/1995 Gaw
5,464,037 A 11/1995 Younes
5,500,961 A 3/1996 Tsai
5,519,253 A 5/1996 Gao et al.
5,519,898 A 5/1996 Guo et al.
5,524,297 A 6/1996 Harrison
5,548,850 A 8/1996 Geeham
5,555,573 A 9/1996 Jensen
5,594,959 A 1/1997 Nichols-Roy et al.
5,603,127 A 2/1997 Veal
5,649,686 A 7/1997 Wilson
5,652,970 A 8/1997 Wodeslavsky
5,659,903 A 8/1997 Hammarstedt
5,673,440 A 10/1997 Carmona
5,711,039 A 1/1998 Mizrahi
5,713,086 A 2/1998 Dicthelan
5,722,454 A 3/1998 Smith et al.
5,754,986 A * 5/1998 Chien ..... 4/327
5,794,278 A 8/1998 Kirt
5,802,628 A 9/1998 Spoeth et al.
5,806,108 A 9/1998 Mizrahi
5,857,661 A 1/1999 Amada et al.
5,873,136 A 2/1999 Geeham
5,887,292 A 3/1999 Goren
5,896,593 A 4/1999 Mizrahi
5,920,919 A 7/1999 Chang
5,970,527 A 10/1999 Martin et al.
6,123,315 A 9/2000 Keller
6,263,519 B1 7/2001 Parsons et al.
6,321,395 B1 11/2001 Parsons et al.
6,370,707 B1 4/2002 Parsons et al.
6,393,624 B1 5/2002 Iwashita
6,421,844 B1 7/2002 Scott
6,453,479 B1 9/2002 Parsons et al.
6,467,100 B2 10/2002 Leach
6,510,563 B1 * 1/2003 Jarosinski et al. ..... 4/326
6,510,866 B2 1/2003 Li
6,637,042 B2 * 10/2003 Hand ..... 4/327
6,742,194 B2 * 6/2004 Shim ..... 4/325
6,775,859 B1 8/2004 Gorginians
6,782,564 B1 8/2004 Cheng
6,795,982 B2 9/2004 Noboru et al.
6,823,534 B2 11/2004 Li
6,898,808 B2 5/2005 Molho et al.
6,920,649 B2 7/2005 Oury
6,934,976 B2 8/2005 Parsons et al.
6,962,163 B1 11/2005 Edwards
6,966,536 B2 11/2005 Enomoto et al.
7,028,975 B2 4/2006 Lee et al.
7,069,604 B2 7/2006 Tomita et al.
7,082,624 B2 8/2006 Yen
7,096,517 B2 8/2006 Gubeli et al.
7,159,251 B2 1/2007 Hennessy

* cited by examiner

FLUSHETTE PARTIAL AND FULL TOILET FLUSH DEVICES

Matter enclosed in heavy brackets [ ] appears in the original patent but forms no part of this reissue specification; matter printed in italics indicates the additions made by reissue.

CROSS-REFERENCE TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

This invention relates to toilet flapper valves which can be installed as adaptor kits into existing toilets or installed as new equipment into new toilets to make such toilets capable of delivering a partial tank amount of water, or a full tank amount of water upon flushing activation.

BACKGROUND OF THE INVENTION

Currently a number of types of dual water quantity toilet flushing devices are available, but only as new toilet installations with completely new internal mechanisms or by performing a complete rebuild of the internal mechanisms in an existing type of standard or regular toilet either of which can be expensive to the average homeowner. It is obvious that a simple and easy to install and operate mechanism is needed at a low cost to provide the necessary incentives to aid in conserving our limited supply of urban water.

OBJECTS OF THE INVENTION

It is a main object of this invention to provide several types of toilet flapper valves which are simple and easy to install and operate and provide a choice of at least two different volumes of water upon flushing a toilet in which these flapper valves are installed.

It is another object of this invention to provide several types of selectable water volume flapper valves which are adjustable as to water volume delivered and can be easily substituted for parts in existing toilets.

It is an additional object of this invention to provide several types of selectable flushing water volume flapper valves which can be easily installed as new equipment in new toilets.

OPERATING PRINCIPALS AND PREFERRED EMBODIMENT

The preferred embodiment of this Flushette invention is a two section flapper valve assembly, made of a flexible, resilient material, with the lower section (herein referred to as a flapper valve discharge tube riser) being tall and hollow and approximately half the height of the maximum amount of water in the toilet tank, with the said lower section pivoting or bending about a point on a clamp-on bracket attached onto a regular type overflow tube in a currently regular type toilet and acting as a flapper valve on a regular type discharge tube seat, and with an upper section consisting of a currently standard type flapper valve, sealing on the top of the flapper valve discharge tube riser lower section, with upper section arms attached to and pivoting or bending near the pivot point of the lower section arms, with either the upper flapper valve section being operated alone for a partial water volume flush or both the upper and lower flapper valve sections being operated together for a full water volume flush and with a counter balance float on the opposite end of the tall, hollow, flapper valve arms or with weight added to the front of the flapper valve discharge tube riser section to assist the flapper valve discharge tube riser section to seal firmly on its seat. An added, optional, feature is having the flapper valve discharge tube riser lower section, made to expand or contract, especially in its vertical dimension, to alter the proportion of water flushed in the partial and full flush operations, plus having the counter balance float also made to expand and contract to alter the downward pressure of the flapper valve discharge tube riser section on its seat on the top of the discharge tube.

Figure 1:
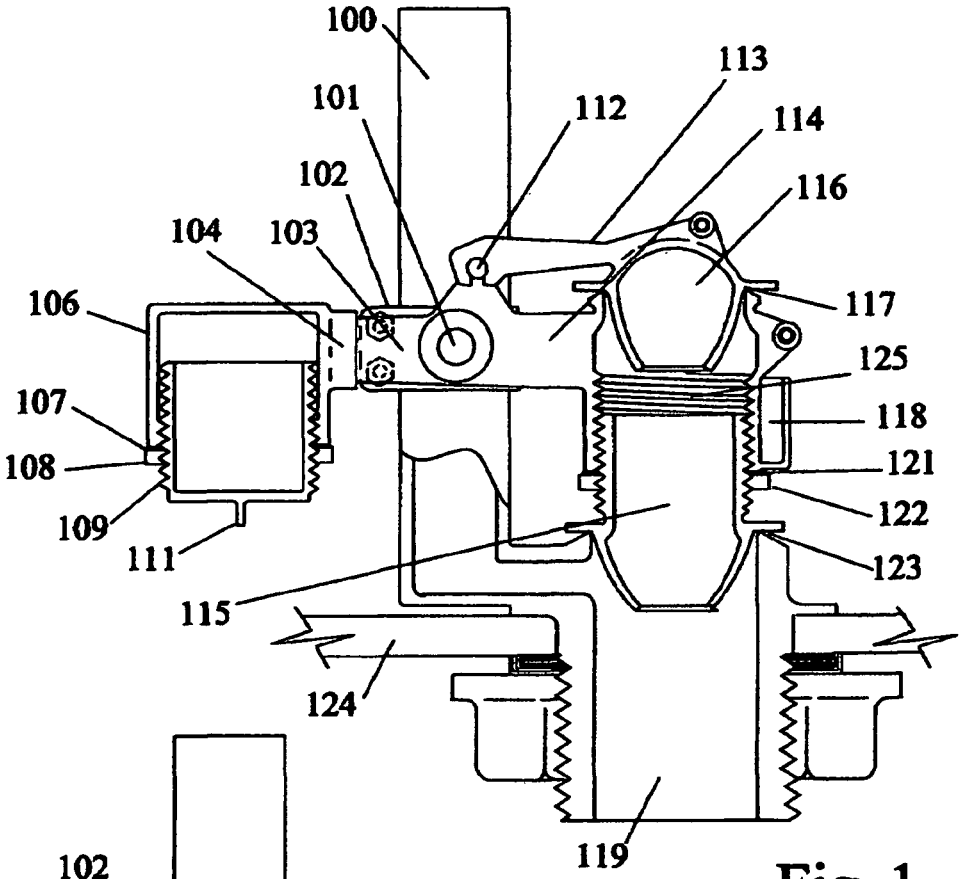
FIG. 1 is a cross section cut-away view of a typical Flushette flapper valve assembly in a currently standard toilet tank, 124, with a discharge tube, 119, leading to a currently standard toilet bowl (not shown) and with a standard toilet overflow tube, 100, with a clamp-on pivot bracket, 102, attached, pointing out its pivot point, 101, where arms, 114, of an optional, two-segment, volume adjustable, flapper valve discharge tube riser section, (upper segment, 125, and lower segment, 115) are attached and with an optional, volume adjustable float, 106, with its lower segment, 109, screwed into its upper segment for volume adjustment, having a gasket seal, 107, and lock nut, 108, and a flat grip, 111, for adjustment turning. Also shown are float attachments, 104, for attaching the optional float, 106, onto the back end, 103, of the arms, 114, of the flapper valve discharge tube riser upper segment, 125, and pivot points, 112, on the top of the flapper valve discharge tube riser arms, 114, onto which fit arms, 113, of a currently standard type flapper valve, 116, which here constitutes the upper section flapper valve, which seals, 117, on the top of the flapper valve discharge tube riser lower section, (115, lower segment, 125, upper segment). Also shown are a gasket seal, 121, between the upper, 125, and lower, 115, segments of the flapper valve discharge tube riser section and a lock nut, 122, securing the adjustment position of the two segments. Also illustrated is a weight pocket, 118, which can be used to assist the flapper valve discharge tube riser to seal on its seat, 123.
Figure 2:
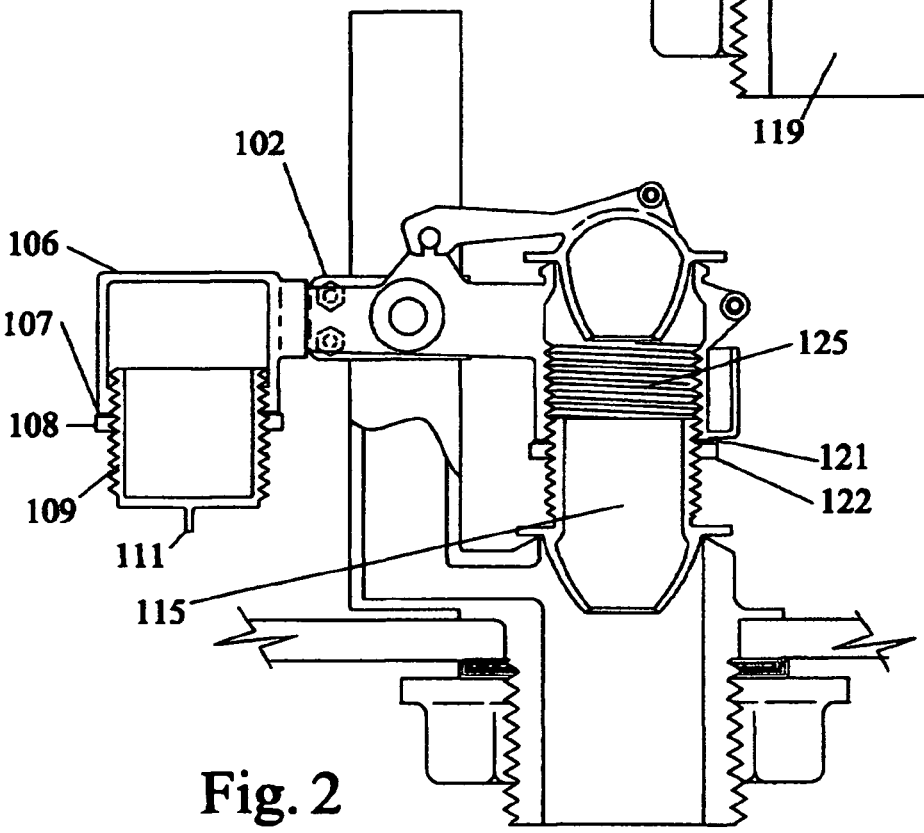
FIG. 2 is a cross section cut-away of a toilet tank with the same Flushette parts as in FIG. 1, excepting that a lengthening adjustment has been made to the lower section, the flapper valve discharge tube riser (upper segment, 125, and lower segment, 115) by extending the lower segment, 115, outward, with a re-tightening of a lock nut, 122, on a gasket seal, 121, and making a lengthening, volume increasing, adjustment to the float, 106, by way of extending its lower segment, 109, using the flap grip, 111, and re-tightening its lock nut, 108, onto its gasket seal, 107, and raising the position of the flapper valve and float assembly on the overflow tube, 100, by loosening, re-positioning and re-tightening the clamp-on bracket, 102.
Figure 3:
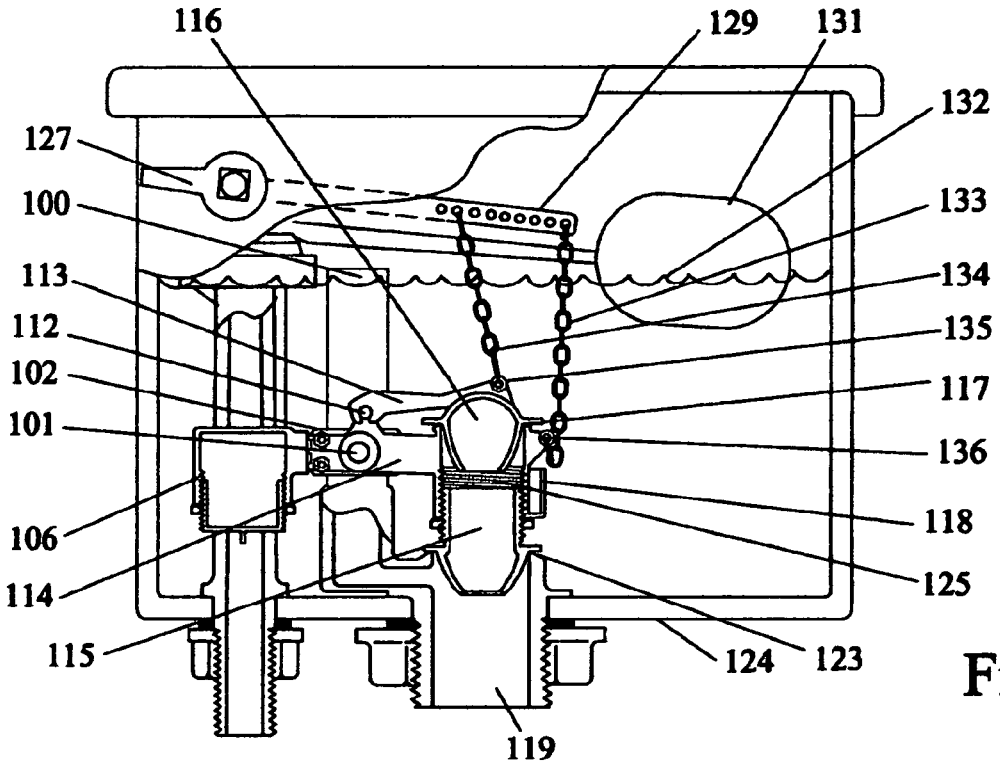
FIG. 3 is a cutaway front view of a typical toilet tank, 124, showing the key elements of a typical Flushette two section flapper valve installation, with the upper section being a currently typical toilet flapper valve, 116, and the lower section being a two-segment flapper valve discharge tube riser (lower segment, 115, upper segment, 125) with a regular type flush handle, 127, an inside actuator arm, 129, with a flapper valve chain, 134, and a flapper valve discharge tube riser chain, 133, shown, along with a regular water level float, 131, and a water level, 132. A flapper valve clamp-on bracket, 102, having a pivot, 101, fastened onto a typical toilet overflow tube, 100, and with arms, 114, of a two segment (lower segment, 115, upper segment, 125) flapper valve discharge tube riser, with arms, 114, fitted over a pivot point, 101, and on the arms, 114, are a second set of pivots, 112, made to receive the arms, 113, of a currently typical flapper valve, 116, which seals on a seat, 117, on the top segment, 125, of the flapper valve discharge tube riser, while the lower segment, 115, of the flapper valve discharge tube riser seals on a seat, 123, on a regular toilet discharge tube, 119, counter-balanced by a float, 106, or by weights added to a weight pocket, 118, on the flapper valve discharge tube riser, which is on the top of a typical toilet discharge tube, 119, and with a chain attachment point, 135, on the typical toilet flapper valve, 109, and a chain attachment point, 136, on the two segment flapper valve discharge tube riser. This arrangement of elements provides that a small amount of resistance and release can be felt in the flushing handle, 127, during a downward push when the currently typical flapper valve, 116, is lifted, causing a partial flush and when the flushing handle, 127, is pushed further downward, much more resistance and release is felt when the flapper valve discharge tube riser and the regular flapper valve are lifted together, to cause a full water volume flush of the toilet.
Figure 4:
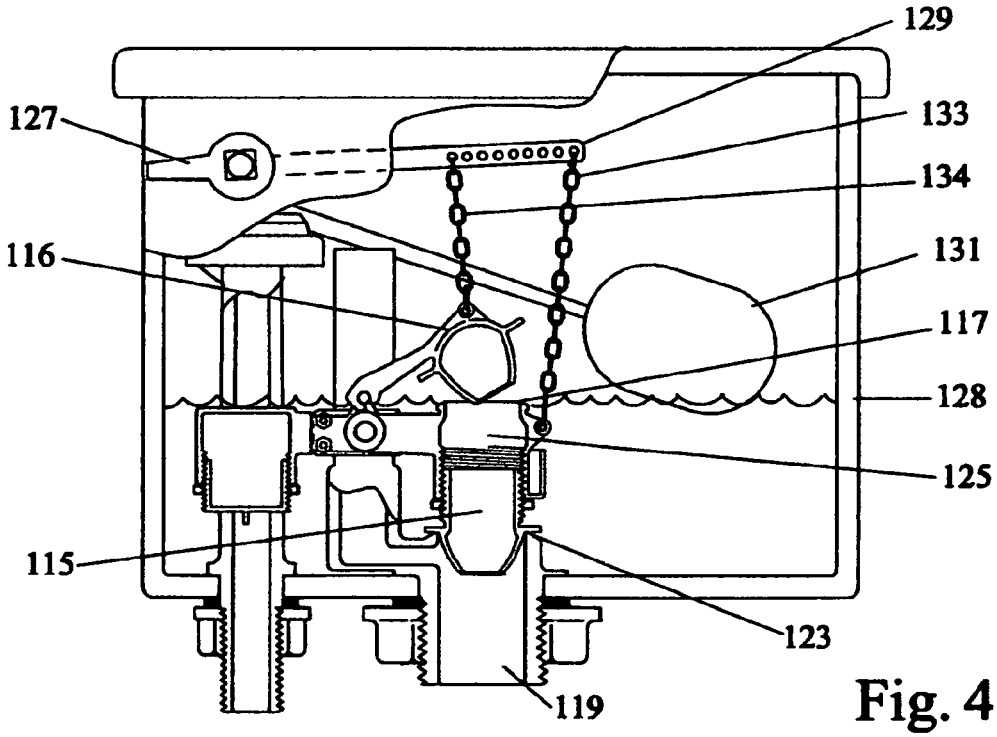
FIG. 4 is a cutaway front view of a toilet tank showing the same key elements of a Flushette toilet flapper valve installation as shown in FIG. 1, FIG. 2 and FIG. 3, excepting that the regular type flapper valve, 116, has been lifted off its seat, 117, on top of the upper segment, 125, of the flapper valve discharge tube riser, by a downward movement of the toilet flush handle, 127, lifting the inside actuator arm, 129, which lifts the flapper valve, 116, by way of a chain, 134, while slack on another chain, 133, is taken up, leaving the two-segment (115, lower segment and, 125, upper segment) flapper valve discharge tube riser on its seat, 123, on top of a typical toilet discharge tube, 119, which allows the water between the level, 132, in FIG. 3, and the level, 128, in this figure, to flow down through the flapper valve discharge tube riser (115, lower segment and, 125, upper segment) and through the discharge tube, 119, to the toilet bowl (not shown).
Figure 5:
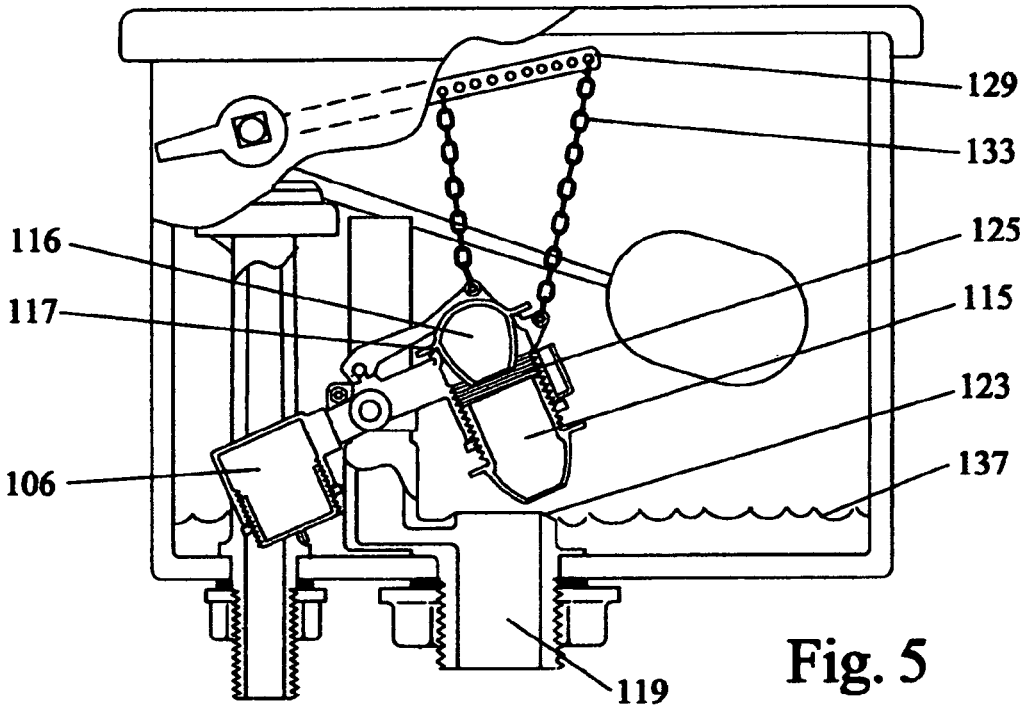
FIG. 5 is a cutaway front view of a regular toilet tank showing the same key elements of a Flushette toilet flapper valve installation as shown in FIG. 1, FIG. 2, FIG. 3 and FIG. 4, excepting that the two segment (115, lower segment 125, upper segment) flapper valve discharge tube riser section has been lifted off of its seat, 123, at the top of the discharge tube, 119, allowing the water in the toilet tank in this figure to drop, from level, 132, in FIG. 3, to the water level, 137, in this figure, which is the level of the seat, 123, and flow down the discharge tube, 119, to the toilet bowl (not shown). Note that the typical flapper valve, 116, which seals on its seat, 117, at the top of the two segment (125, upper segment, 115, lower segment) flapper valve discharge tube riser section, remains against its seat, 117, as the two segment flapper valve discharge tube riser is lifted by the inside actuator arm, 129, and the chain, 133, while the counter-balance float, 106, has dropped, because of the lift of the arm and chain and is unaffected by the drop in water level, 137.
Figure 7:
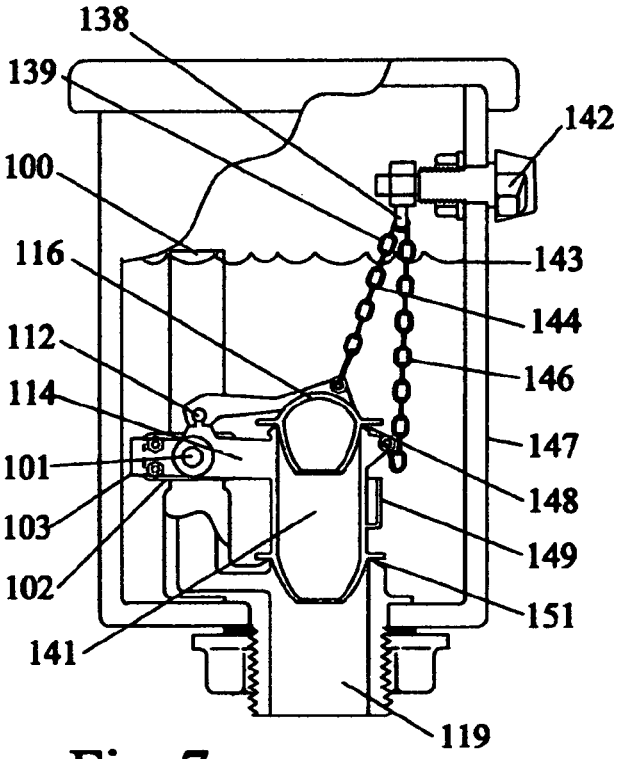
FIG. 7 is a cutaway side view of a typical toilet tank showing a Flushette installation where a flapper valve clamp-on bracket, 102, is attached to a regular type overflow tube, 100, with said flapper valve clamp-on bracket, 102, having a pivot, 101, onto which fit the arms, 114, (shown without counter-balance float or weights) of a single segment flapper valve discharge tube riser, 141, which seals onto a seat, 151, at the top of a discharge tube, 119, which leads to a toilet bowl (not shown) and a flapper valve pivot, 112, to which are attached arms of a regular type flapper valve, 116, which is operated by chain, 139, and seals onto a seat, 148, at the top of said single segment flapper valve discharge tube riser, 141, and seals off water flow to the discharge tube, 119, which conducts water to a toilet bowl (not shown). Note that a regular toilet flush operating handle, 142, is shown, attached to a regular inside arm, 138, with a flapper valve discharge tube riser chain, 146, having a certain amount of slack shown at its lower end, attached to the single segment flapper valve discharge tube riser, 141, and a chain, 144, attached to a typical flapper valve, 116, which fits onto and seals the top seat, 148, on the single segment flapper valve discharge tube riser, 141, and that the water level, 143, is controlled by a regular type toilet float, through a regular fill valve and fill tube, all within a toilet tank, 147. Note that a counter-balance float, such as that shown as item 106 in FIG. 1, FIG. 2, FIG. 3 and FIG. 6, is not attached to the arm ends, 103, but weights are added to the weight pocket, 149, to act as a floatation counter balance and assist the single segment flapper valve discharge tube riser, 141, to stay firmly on its seat, 151.
Figure 6:
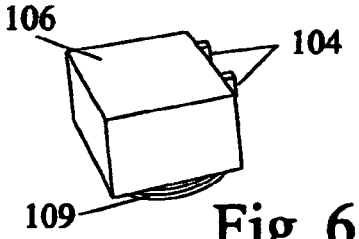
FIG. 6 is an isometric view of a counter-balance float, 106, which is also shown as item 106 in FIG. 1, FIG. 2, FIG. 3 and FIG. 5, pointing out attachment members, 104, which fit to the ends of the arms, item 103, in FIG. 1, and FIG. 7, and also pointing out the float volume enlargement and reduction segment, 109, (See FIG. 1 and FIG. 2, items 106, 107, 108, 109 and 111). Note that the float displacement should be approximately equal to the displacement of the flapper valve discharge tube riser and the typical flapper valve shown in other figures herein.
Figure 8:
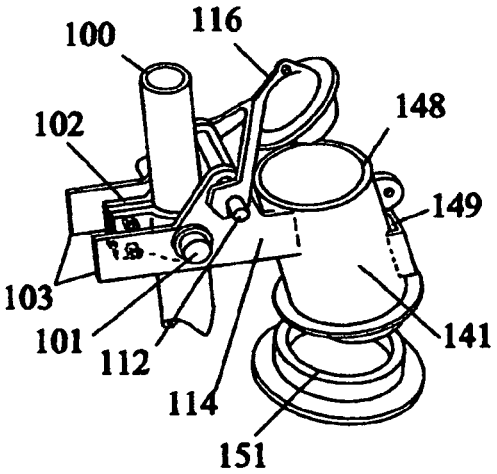
FIG. 8 is an isometric view of the key elements of a typical Flushette installation, such as that shown in FIG. 7, pointing out a regular toilet overflow tube, 100, a flapper valve pivot clamp-on bracket, 102, attached to the overflow tube, 100, a pivot, 101, on the flapper valve pivot clamp-on bracket, 102, over which are fitted arms, 114, of a single segment flapper valve discharge tube riser, 141, which has a seat, 148, on its top surface, onto which seals a regular type flapper valve, 116, which swings on pivots, 112, on the top of the arms, 114, of the flapper valve discharge tube riser, 141, which itself seals on a seat, 151, at the top of a toilet discharge tube, 119, which leads to a toilet bowl (not shown). Note that weights in a weight pocket, 149, substitute for a float, such as that shown in FIG. 6, which may be optionally attached to arm ends, 103.
Figure 9:
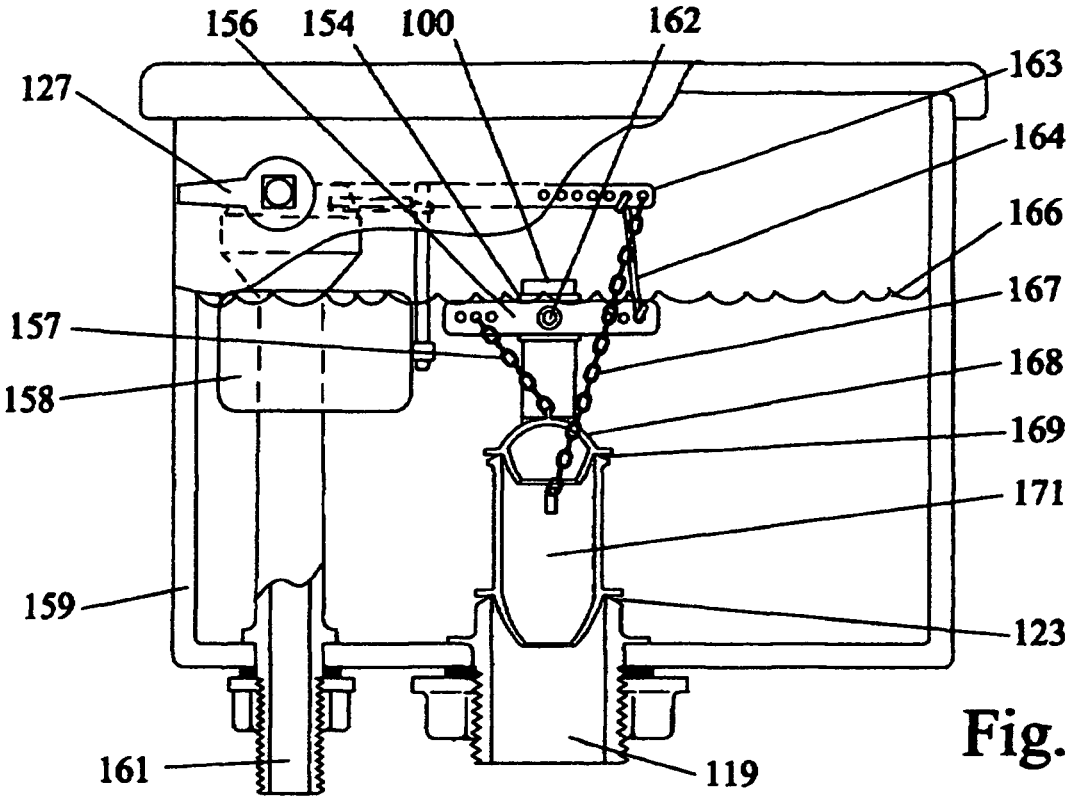
FIG. 9 is a cutaway front view of a regular toilet tank, 159, showing another Flushette flapper valve arrangement in static, non-flushed, full toilet tank position, with water level, 166, and with a typical single segment flapper valve discharge tube riser, 171, having a regular flapper valve, 168, on its top, and having a pivot beam clamp-on bracket, 154, in addition to a flapper valve clamp-on bracket (not shown in this figure, but shown as item 102 in FIG. 8), attached to an overflow tube, 100, with a pivot beam, 156, pivoting on a pivot point, 162, and with a drive rod, 164, between an inside actuator arm, 163, and the pivot beam, 156, with a flapper valve chain, 157, to lift a typical flapper valve, 168, off of its seat, 169, which is on the top of a single segment flapper valve discharge tube riser, 171, when a toilet flushing handle, 127, is lifted upward, which lowers the end of the inside actuator arm, 163. Note that the flapper valve discharge tube riser chain, 167, goes slack (See item 167 in FIG. 10) when the outside flush handle, 127, is lifted upward and the actuator arm, 163, moves downward, not lifting the flapper valve discharge tube riser off of its seat, 123, and not letting water flow down the discharge tube, 119, by way of that seat, 123. Also shown is another typical type of commonly used toilet float, 158, and fill tube, 161, illustrating that the Flushette parts will adapt to most kinds of currently typical toilets. The main operating difference between the assembly shown in this figure and those shown in previous figures is that a partial flush is achieved when the toilet flushing handle, 127, is lifted upward and a full flush is achieved when the toilet flushing handle, 127, is pushed downward.
Figure 10:
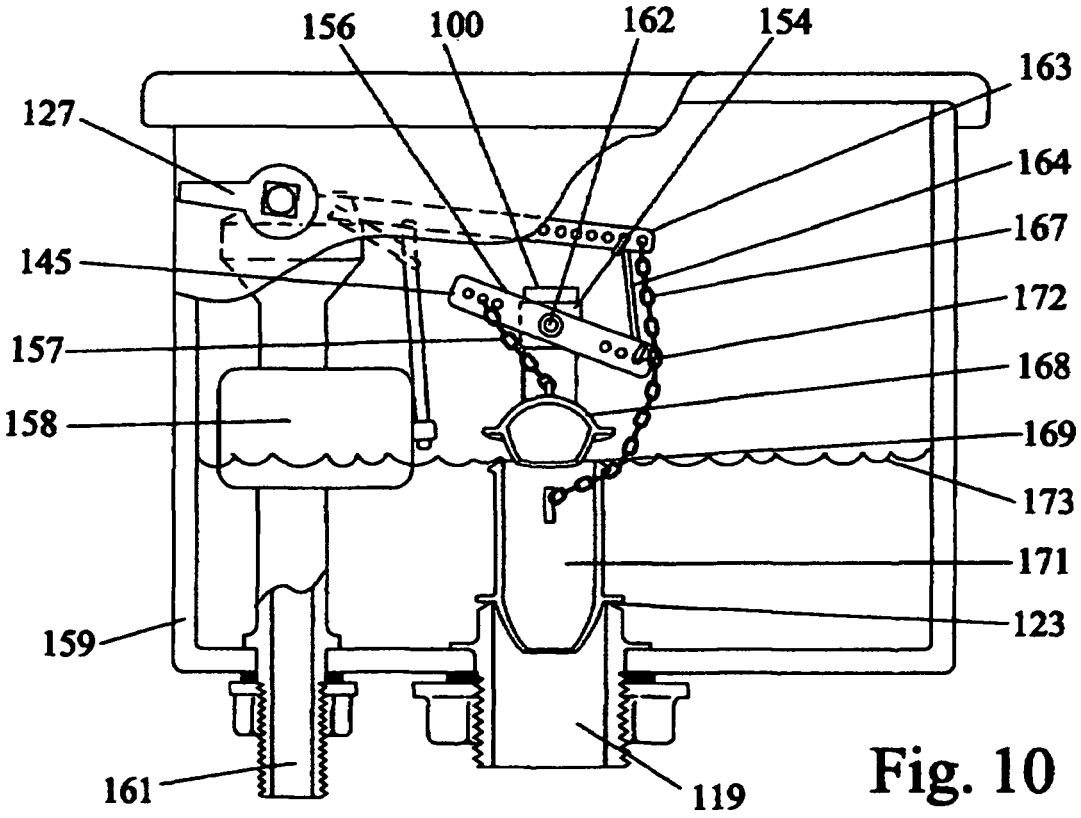
FIG. 10 is a cutaway front view of the same toilet tank, 159, as in FIG. 9, showing the Flushette assembly, excepting that the toilet flushing handle, 127, has been actuated upward, moving the inside actuator arm, 163, downward, which causes a drive rod, 164, to push down one end, 172, of a pivot beam, 156, which pivots on a pivot point, 162, on a pivot beam clamp-on bracket, 154, attached to an overflow tube, 100, causing the other end of the pivot beam, 145, to lift upward, pulling on the flapper valve chain, 157, which raises a typical flapper valve, 168, off of its seat, 169, on the top of a single segment flapper valve discharge tube riser, 171, allowing only the water between the level of item 166, in FIG. 9, and the level, 173, in this figure to flown down through the flapper valve discharge tube riser, and into the toilet discharge tube, 119, for a partial flush, and because the water in the tank has dropped to a new water level, 173, the float, 158, is actuating the fill valve at the top of a fill tube, 161, and refilling the toilet tank, 159, from level, 173, back up to the level shown as 166, in FIG. 9. Note that a second chain, 167, attached to a single segment flapper valve discharge tube riser, 171, is slack and not raising the single segment flapper valve discharge tube riser, 171, off its seat, 123, at the top of the discharge tube, 119.
Figure 11:
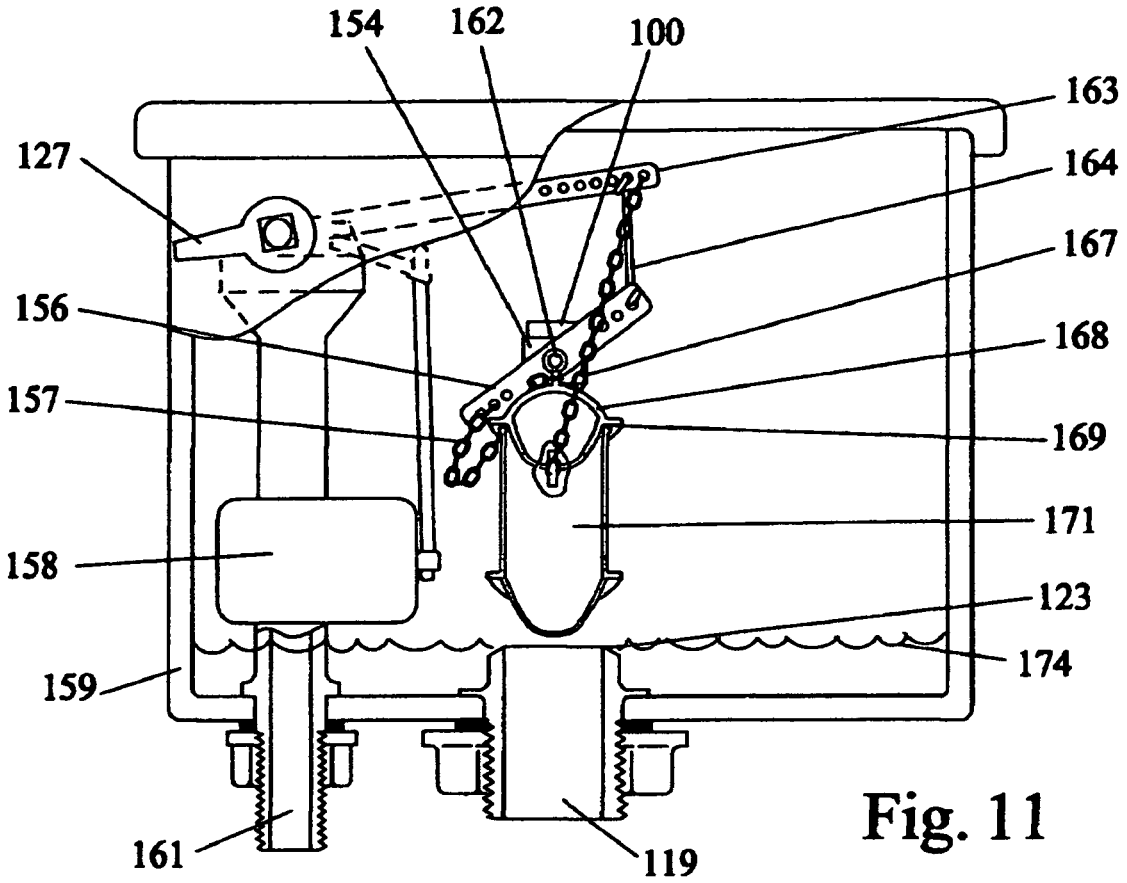
FIG. 11 is a cutaway front view of the same toilet tank as in FIG. 9 and FIG. 10, showing the Flushette flapper valve assembly, excepting that the toilet flushing handle, 127, has been pushed downward, moving the inside actuator arm, 163, upward, causing a chain, 167, to raise the single segment flapper valve discharge tube riser, 171, off of its seat, 123, and allowing water in the toilet tank, 159, to flow down through the toilet tank discharge tube, 119, creating a full flush, and a new, lower, water level, 174, whereupon a currently standard type toilet float, 158, actuates a fill valve at the top of a fill tube, 161, refilling the toilet tank. Note that a rod, 164, has lifted one end of the pivot beam, 156, which pivots on a pivot point, 162, on the pivot beam clamp-on bracket, 154, attached to the typical overflow tube, 100, slackening the chain, 157, attached to the typical flapper valve, 168, and that the typical flapper valve, 168, because of the lifting of the single segment flapper valve discharge tube riser, 171, has remained on its seat, 169, on the top of the single segment flapper valve discharge tube riser, 171, causing the upper, typical flapper valve, 168, and the lower, single segment flapper valve discharge tube riser, 171, to act together as a single flapper valve unit.
Figure 12:
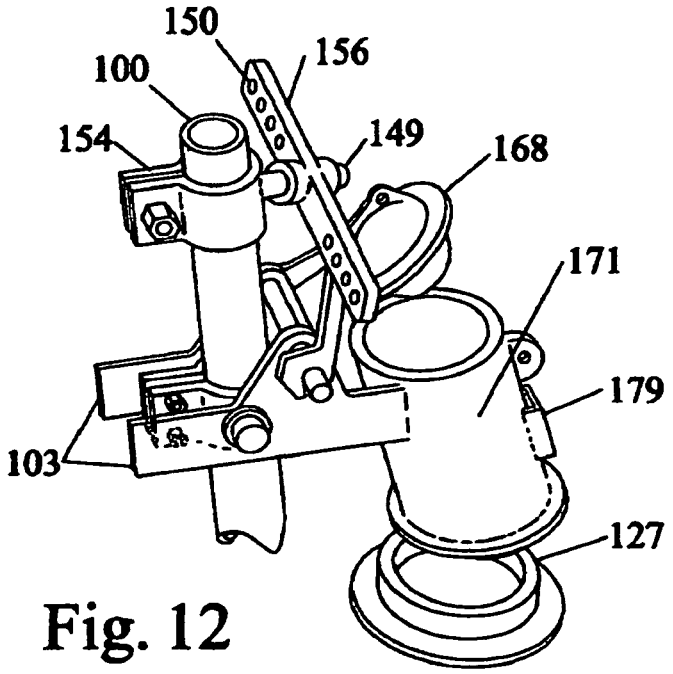
FIG. 12 is an isometric view of the key elements of a Flushette installation as illustrated in FIG. 9, FIG. 10 and FIG. 11, using a pivot beam clamp-on bracket, 154, attached to a typical overflow tube, 100, in a toilet, with the pivot beam clamp-on bracket, 154, having a pivot point, 149, upon which a pivot beam, 156, with holes, 150, is mounted to facilitate the desired actions of actuating the toilet flushing handle upward to partially flush a toilet or actuating the toilet flushing handle downward to fully flush the same toilet, as illustrated in FIG. 9, FIG. 10 and FIG. 11. Also illustrated are a regular type flapper valve, 168, a single segment flapper valve discharge tube riser, 171, and its seat, 127, at the top of a regular toilet discharge tube leading to a toilet bowl (not shown). Note that the ends, 103, of the arms attached to the single segment flapper valve discharge tube riser, 171, protrude in such a way as to allow the fitting of a counter-balance float, such as the one shown as item 106 in FIG. 6, if space allows, or if there is limited space, weights are added to a weight pocket, 179, to assist the flapper valve discharge tube riser to seal on its seat, 127.
Figure 13:
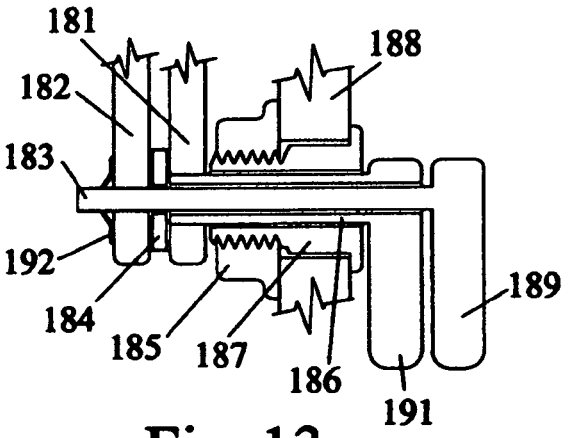
FIG. 13 is a cutaway view looking down on a set of dual flushing handles in the wall of a toilet, 188, such as shown in the isometric view of FIG. 14, with a first inside actuator arm, 181, connected to and activated by a full flush outside handle, 191, and a second inside actuator arm, 182, connected to and activated by a light flush outside handle, 189, with a spacer, 184, between the two inside actuator arms, 181, and 182, and a push-on retainer, 192, pushed onto a shaft, 183, which runs between the light flush outside handle, 189, and the second actuator arm, 182, to hold the arms onto the shaft and with a nut, 185, on a toilet tank through-hull fitting, 187, to hold the assembly in place while a second, tubular shaft, 186, runs between the full flush outside handle, 191, and the first inside actuator arm, 181.
Figure 14:
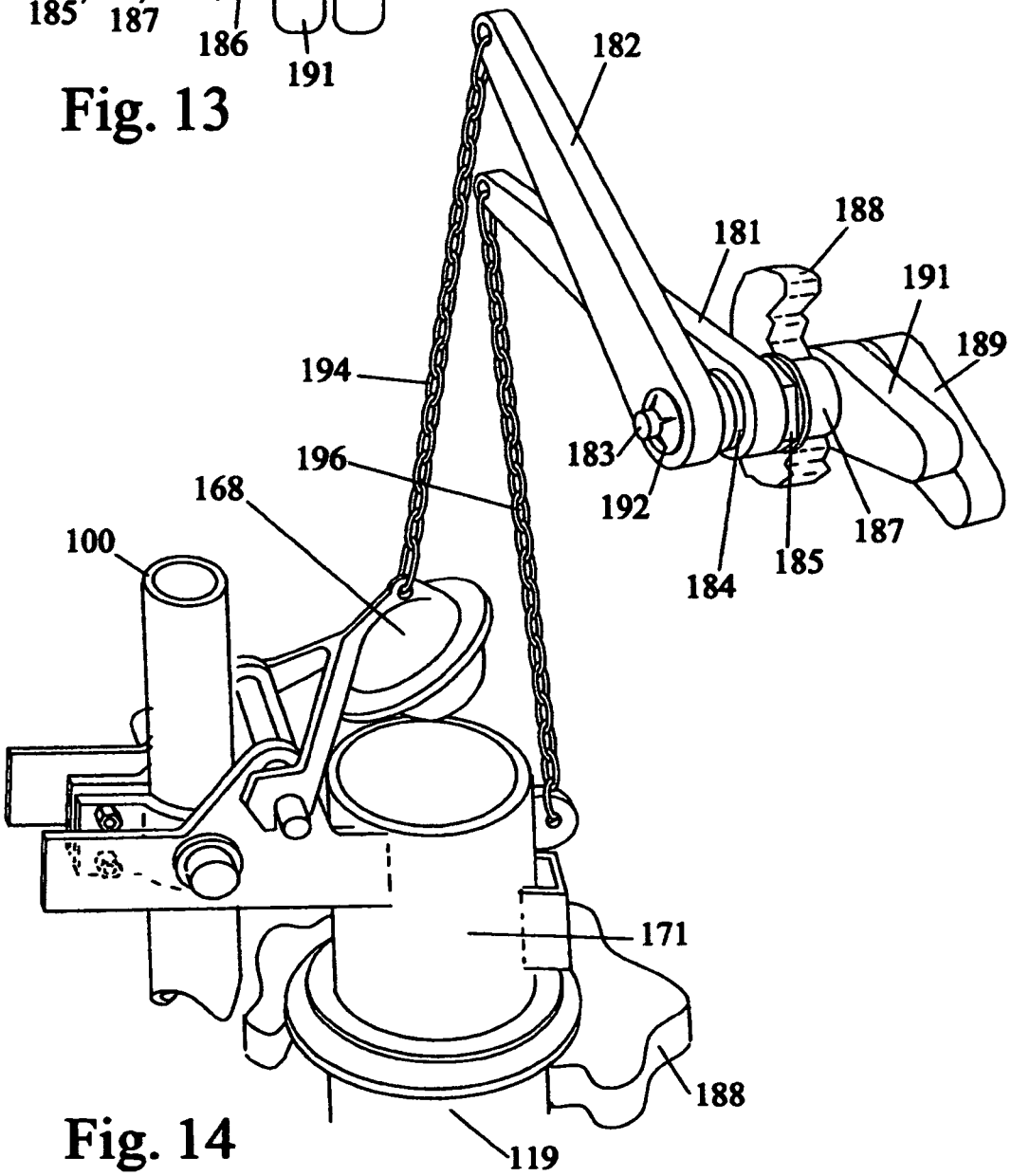
FIG. 14 is an isometric view of a Flushette assembly mounted on an overflow tube, 100, within a toilet tank, 188, operated by two separate flush handles, and held in place by a through hull toilet tank fitting, 187, a nut, 185 and a push-on retainer, 192, with an outside light flush handle, 189, driving a shaft, 183, which drives a second inside actuator arm, 182, which moves a flapper valve chain, 194, to lift a regular type flapper valve, 168, and a full flush outside handle, 191, driving a tubular shaft (not visible in this view), which drives a first inside actuator arm, 181, which moves a flapper valve discharge tube riser chain, 196, and an attached flapper valve discharge tube riser, 171, on a toilet discharge tube, 119, with a spacer, 184, between the two inside actuator arms, 181, and 182. Actuating only the outside light flush handle, 189, initiates a partial, or light, flush amount of water, while actuating both outside handles together or the full flush outside handle, 191, alone initiates a full flush amount of water.
Figure 15:
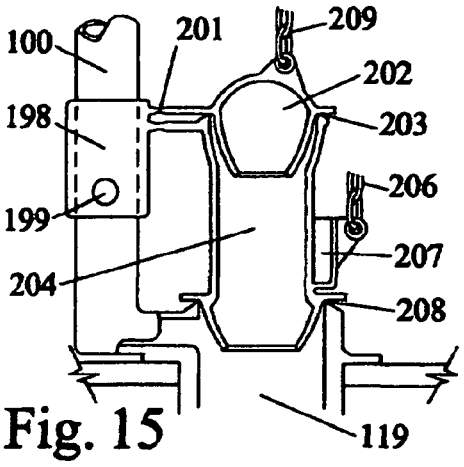
FIG. 15 is a cutaway view of a Flushette device molded as a single flexible, resilient piece with a mounting bracket, 198, having round, shaft like protrusions, 199, on each side, fitted over a toilet overflow tube, 100, with flex sections, 201, in the arm holding an upper flapper valve section, 202, and a lower flapper valve discharge tube riser section, 204, which has a seat at its top, 203, onto which seals the upper flapper valve section, 202, and with the flapper valve discharge tube riser section, 204, sealing on a seat, 208, at the top of a toilet discharge tube, 119. Also shown are an upper flapper valve activating chain, 209, and a flapper valve discharge tube riser activating chain, 206, along with a weights pocket, 207, for holding counter balance weights to assist the flapper valve discharge tube riser, 204, to stay firmly on its seat, 208.
Figure 16:
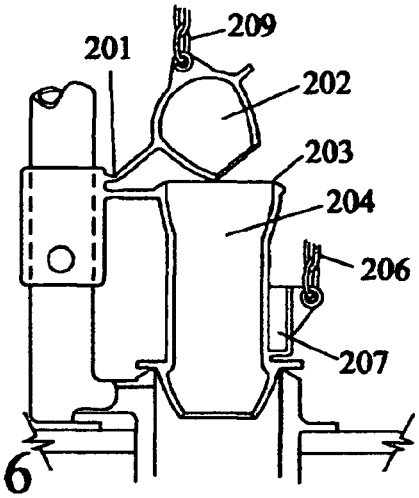
FIG. 16 is a cutaway view of a similar single piece flexible, resilient Flushette device as shown in FIG. 15, with a flex point, 201, a chain, 209, an upper flapper valve section, 202, a seat, 203, at the top of a flapper valve discharge tube riser, 204, with a chain, 206, attached just above a weight pocket, 207, excepting that the upper flapper valve chain, 209, has been activated to lift the flapper valve section, 202, to allow water to flow down through the flapper valve discharge tube riser section, 204, and into a toilet bowl (not shown).
Figure 17:
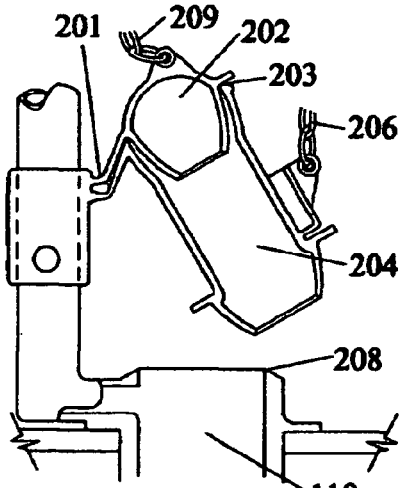
FIG. 17 is a similar single piece flexible, resilient Flushette device as those shown in FIG. 15 and FIG. 16, except that the chain, 206, has lifted the tall hollow flapper valve, 204, off of its seat, 208, causing bending at the flex point, 201, and slackening the upper flapper valve chain, 209, which leaves the upper flapper valve section, 202, on its seat, 203, at the top of the flapper valve discharge tube riser section, 204, which allows water to flow down over the seat, 208, and into a toilet bowl (not shown) by way of the toilet discharge tube, 119.
Figure 18:
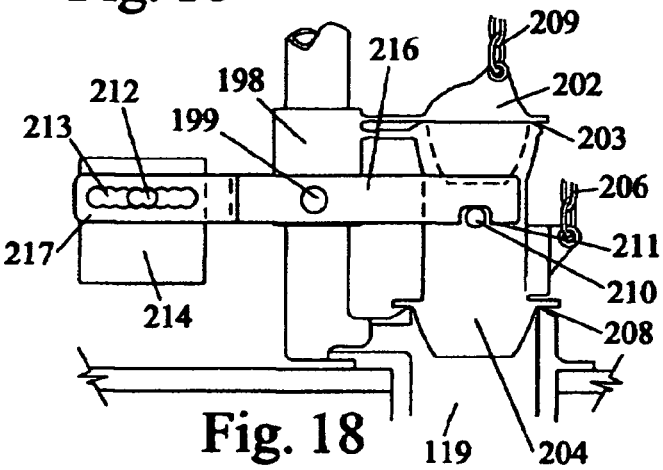
FIG. 18 is a side view of a single piece, molded, flexible, resilient Flushette device, similar to those shown in FIG. 15, FIG. 16, and FIG. 17, excepting that a counter balance float, 214, has been added to the assembly, on a mounting bracket, 198, having round protrusions, 199, on its sides over which are fitted arms, 216, which extend out and become a yoke, 217, having slots, 213, on both yoke arms, with interferences along the edges of the slots, into which are fitted double round, near figure eight shaped protrusions, 212, extending from the sides of the float, 214, with notches, 211, in the arms, 216, at the opposite end from the float, 214, and protrusions, 210, on the sides of the flapper valve discharge tube riser, 204, for the purpose of transferring the upward pressure from the float, 214, through the pivot point, 199, and onto the flapper valve discharge tube riser, 204, as the float, 214, tries to rise in water and the arms, 216, pivot on the round protrusions, 199, on the mounting bracket, 198. Note that the double round, near figure eight shaped protrusions, 212, on the float, 214, and the interferences in the slots, 213, in the yoke, 217, provide means to make adjustment to floatation pressure to counter balance the flapper valve discharge tube riser section, 204, and assist in keeping it on its seat, 208. Also shown are a chain, 209, on the upper flapper valve, 202, the upper flapper valve seat, 203, on the top of the flapper valve discharge tube riser, 204, another chain, 206, on the flapper valve discharge tube riser, 204, and a toilet discharge tube, 119, leading to a toilet bowl (not shown).
Figure 19:
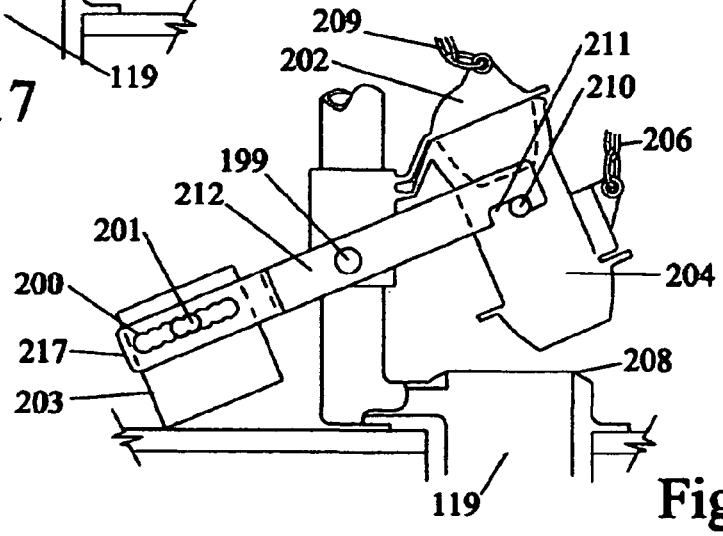
FIG. 19 is a side view of a single piece flexible, resilient Flushette device as shown in FIG. 18, excepting that the flapper valve discharge tube riser section, 204, of the device has been lifted by its chain, 206, also lifting the upper flapper valve, 202, by its position on the top of the flapper valve discharge tube riser section, 204, with its chain, 209, going slack and adding weight to assist in keeping the upper flapper valve section, 202, seated on top of the flapper valve discharge tube riser section, 204, while the float, 203, is pushed downward and exerts pressure upward by its tendency to float, putting pressure through the double round near figure eight protrusions, 201, on the sides of the float and into the yoke, 217, and the arms, 212, through the pivots, 199, to the notches, 211, and the protrusions, 210, on the sides of the flapper valve discharge tube riser section, 204, tending to push it back down onto its seat, 208, on the toilet discharge tube, 119. Also note that the flapper valve discharge tube riser section, 204, and the upper flapper valve section, 202, act together as a single flapper valve, and being raised off of the seat, 208, at the top of the toilet discharge tube, 119, allows a full tank of water to flow down the toilet discharge tube, 119, and into a toilet bowl (not shown). Note that lifting only the upper flapper valve chain, 209, without lifting the flapper valve discharge tube riser chain, 206, allows only a partial tank of water to flow down through the flapper valve discharge tube riser, 204, and through the toilet discharge tube, 119, and into a toilet bowl (not shown).

I claim:

[1. A dual flush flapper valve apparatus comprising; a lower hollow segment having an upper open top and an open bottom, said open bottom adapted to seal a valve seat of a known toilet discharge tube, an upper segment engaged with said open top of said lower segment, a clamp on pivot bracket adapted to receive and be clamped onto a standpipe of a known toilet discharge outlet, said upper segment being pivotally attached to said bracket to allow swinging movement of said upper and lower segments between a sealing and a non-sealing disposition with respect to said toilet discharge tube, said upper segment having an open top forming a valve seat adapted to receive a conventional flapper valve in sealing engagement therewith, an adjustable float cantilevered to said bracket on a side opposite to said upper and lower segments, said adjustable float comprising a lower portion adjustably attached to an upper portion, said bracket having pivot points thereon to accept pivot arms of a conventional flapper valve.]

[2. A dual flush toilet flapper valve as in claim 1, having a pocket into which can be placed weights to help hold the flapper valve segments on the toilet discharge tube.]

*3. A dual flush flapper valve apparatus comprising:*

*a riser segment comprising a lower hollow segment having an upper open top and an open bottom, said open bottom adapted to seal a valve seat of a known toilet discharge tube and an upper segment engaged with said open top of said lower segment, said upper segment having an open top forming a valve seat adapted to receive a conventional flapper valve in sealing engagement therewith,*

*a clamp on pivot bracket adapted to receive and be clamped unto a standpipe of a known toilet discharge outlet, said upper segment being pivotally attached to said bracket to allow swinging movement of said upper and lower segments between a sealing and-non-sealing disposition with respect to said toilet discharge tube, said bracket having pivot points to accept pivot arms of said conventional flapper valve, and*

*an adjustable float cantilevered to said bracket on a side opposite to said upper and lower segments, said adjustable float comprising a lower portion adjustably attached to an upper portion.*

*4. A dual flush toilet flapper valve as in claim 3, having a pocket into which can be placed weights to help hold the flapper valve segments on the toilet discharge tube.*

*5. A dual flush toilet discharge valve apparatus as in claim 3, having an adjustable float cantilevered to said bracket on a side opposite to said riser segment, said adjustable float comprising a lower portion adjustably attached to an upper portion.*

*6. A dual flush toilet discharge valve apparatus as in claim 3, having a pocket into which can be placed weights to help hold the valve segments on the toilet discharge tube.*

* * * * *